(No Model.)
M. RICE.
FILTER FOR CISTERNS.
No. 373,377. Patented Nov. 15, 1887.
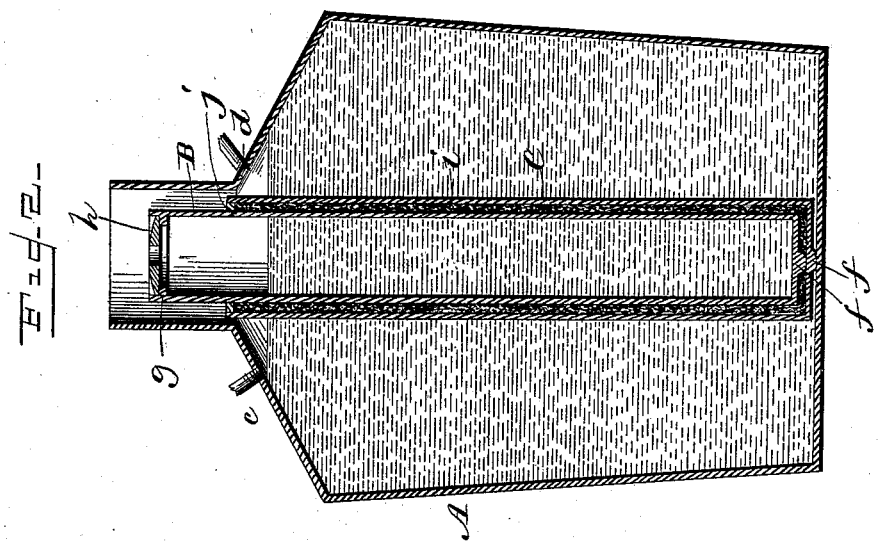
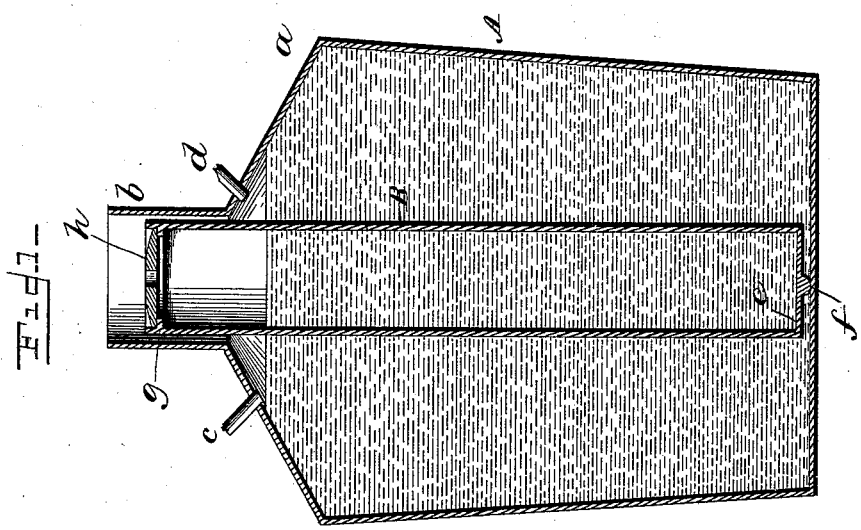
WITNESSES
INVENTOR
Malcolm Rice
Attorney

UNITED STATES PATENT OFFICE.

MALCOLM RICE, OF SEBEWA, MICHIGAN.

FILTER FOR CISTERNS.

SPECIFICATION forming part of Letters Patent No. 373,377, dated November 15, 1887.

Application filed March 25, 1886. Serial No. 196,557. (No model.)

*To all whom it may concern:*

Be it known that I, MALCOLM RICE, a citizen of the United States of America, residing at Sebewa, in the county of Ionia and State of Michigan, have invented certain new and useful Improvements in Filters for Cisterns; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to filters for wells or cisterns; and it consists in the improvements hereinafter described and set forth.

In the accompanying drawings, forming part of this specification, Figure 1 is a vertical sectional elevation of the cistern provided with my improvement, and Fig. 2 a like view illustrating a modification.

In carrying out my invention I provide a cistern or well lining comprising a vessel or receptacle, A, of the form illustrated in the drawings, having its upper portion, *a*, contracted and terminating in a vertical neck, *b*. The said vessel A is provided at either end adjacent to said neck with inlet and overflow openings *c d*, respectively.

Centrally within the cistern or vessel A is located a narrow cylindrical vessel, B, which is of such size as to enable it to be passed into the vessel through the neck *b*, and withdrawn therefrom in the same manner. This cylinder B is made from terra-cotta, brick, or other similar porous substance, and is closed at its bottom *e*, which latter is provided on its end face with a central nib or projection, *f*, which maintains said bottom *e* out of contact from the bottom of the cylinder A.

As shown in Fig. 1, the cylinder B extends well up into the neck *b* above the overflow-opening, and is provided interiorly, near its upper end, with an annular shoulder, *g*, designed to effect a seat or bearing for the cap or cover *h*, centrally perforated for the passage of a pump-tube, siphon-tube, or any other known device by which the filtered water within the filtering-cylinder B may be withdrawn for use.

It will be understood that the cylinder permits the water in the cistern to percolate through the walls of the cylinder, thereby purifying said water, and the size of the cylinder is such that it may be readily withdrawn from the cistern to permit it to be cleansed.

As illustrated in Fig. 2, the cylinder B rests within a jacket, C, of greater diameter than the cylinder B, so as to form between them an annular space for the reception of charcoal or other filtering medium, *i*, both cylinders B and C being provided with projections *f f*, which maintain them out of contact with each other at their lower portions, and also keep the outer cylinder, C, from contact with the bottom of the cistern.

As will be noted, the cylinder C extends up only to a point on a line with the bottom of the neck *b*, a collar, *j*, being placed between the cylinders at such point to prevent the filtering medium from working out from between the cylinders.

Both cylinders B and C are porous, and the water percolates through, as in the first place. The outer face of the cylinder B is painted or otherwise waterproofed from a point below the collar *j* to its upper extremity, which prevents overflow-water from working into the inner cylinder, B, above said collar, and necessitates its percolating through the charcoal or other filtering medium.

It will be understood that by providing the central narrow filtering-cylinders the upper portion of the well or cistern may be closed or contracted, so as to prevent the ingress of dirt or other foreign matter while the filtering effect is secured.

It will be understood that the outlet-opening of lining A is only to determine the greatest possible height of the unfiltered water in the cistern, and as this outlet-opening is positioned below the top of the filtering-cylinder it follows that unfiltered water cannot reach the interior of said filtering-cylinder.

I claim—

1. In combination with a cistern having inlet and overflow openings and an upwardly-projecting neck which extends above the inlet and overflow openings a filtering-cylinder made up of a pervious material, said cylinder being adapted to rest upon the floor of the cistern, the same being of a sufficient length to extend above the inlet and overflow openings of the cistern, substantially as shown.

2. The combination, substantially as before set forth, of the well or cistern lining provided near the top with inlet and overflow apertures and an open tubular neck extending above said apertures, and the pervious filtering-vessel closed at the bottom and extending upward within said neck above the outlet-aperture of the lining.

3. The combination, substantially as set forth, of a well or cistern having inlet and overflow openings and a tubular neck which extends above said openings, a pervious filtering-vessel closed at the bottom and extending upwardly within said neck above the inlet and overflow openings, an inner cylinder or vessel adapted to be placed within the outer filtering-vessel, so as to provide a space between the same, and a packing of filtering material occupying the space between the inner and outer filtering-vessels, substantially as shown, and for the purpose set forth.

In testimony whereof I affix my signature in presence of two witnesses.

MALCOLM RICE.

Witnesses:
E. F. COLWELL,
A. A. GARLOCK.